(12) United States Patent
Nagasawa

(10) Patent No.: US 8,825,367 B2
(45) Date of Patent: Sep. 2, 2014

(54) VEHICLE SYSTEM AND METHOD FOR CONTROLLING VEHICLE SYSTEM

(71) Applicant: Murata Machinery, Ltd., Kyoto (JP)

(72) Inventor: Atsuo Nagasawa, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 0 days.

(21) Appl. No.: 13/742,389

(22) Filed: Jan. 16, 2013

(65) Prior Publication Data

US 2013/0211626 A1 Aug. 15, 2013

(30) Foreign Application Priority Data

Feb. 15, 2012 (JP) ................. 2012-030186

(51) Int. Cl.
*G06F 17/10* (2006.01)
(52) U.S. Cl.
USPC ............ 701/301; 701/414; 701/422; 701/423
(58) Field of Classification Search
CPC ........... G01C 21/26; G08G 1/16; G08G 1/00; B62D 15/0265
USPC ................. 701/301, 414, 422–423
See application file for complete search history.

(56) References Cited

U.S. PATENT DOCUMENTS

| 8,135,496 B2 | 3/2012 | Hayashi | |
|---|---|---|---|
| 2005/0156756 A1 | 7/2005 | Fujita et al. | |
| 2007/0010938 A1* | 1/2007 | Kubota et al. | 701/200 |
| 2007/0197230 A1* | 8/2007 | Roggero et al. | 455/456.1 |
| 2008/0133136 A1 | 6/2008 | Breed et al. | |
| 2008/0186206 A1* | 8/2008 | Reumerman | 340/902 |
| 2009/0185489 A1* | 7/2009 | Ruffini et al. | 370/237 |
| 2009/0207005 A1* | 8/2009 | Habetha et al. | 340/435 |
| 2011/0060490 A1 | 3/2011 | Sato | |
| 2011/0298603 A1 | 12/2011 | King et al. | |
| 2013/0158800 A1* | 6/2013 | Trageser | 701/41 |

FOREIGN PATENT DOCUMENTS

| JP | 2962747 B2 | 10/1999 |
|---|---|---|
| JP | 2004-127010 A | 4/2004 |
| JP | 2005-301364 A | 10/2005 |
| JP | 4798554 B2 | 10/2011 |

OTHER PUBLICATIONS

Official Communication issued in corresponding European Patent Application No. 13151499.4, mailed on May 31, 2013.

* cited by examiner

*Primary Examiner* — Hussein A. Elchanti
(74) *Attorney, Agent, or Firm* — Keating & Bennett, LLP

(57) ABSTRACT

A vehicle system includes a travel route including a merging section including a first entrance and a second entrance, a plurality of vehicles configured to travel on the travel route in one direction, and a ground controller configured and programmed to communicate with the plurality of vehicles. Any other vehicle expected to enter the merging section from the first entrance when a first vehicle is expected to enter the merging section from the second entrance is mapped on the travel route of the first vehicle based on a position and a velocity of the first vehicle and a position and a velocity of the other vehicle. A preceding-following relationship between the first vehicle and the other vehicle is determined from the position of the first vehicle and the position of the other vehicle after the mapping, and travel of the first vehicle is controlled so as to avoid a collision with the other vehicle.

17 Claims, 3 Drawing Sheets

VEHICLE SYSTEM AND METHOD FOR CONTROLLING VEHICLE SYSTEM

BACKGROUND OF THE INVENTION

1. Field of the Invention

The present invention relates to a vehicle system, and particularly relates to eliminating the need for blocking at a merging section.

2. Description of the Related Art

Vehicles such as overhead travelling vehicles and autoguided vehicles monitor vehicles in front thereof using a forward-looking sensor. However, at a merging section, it is difficult to simultaneously monitor other vehicles that enter the merging section, and, thus, a ground-side controller performs exclusive control such that the number of vehicles that are simultaneously present in the merging section is restricted to one or zero. See, for example, Japanese Patent No. 4835937. This control, which is referred to as blocking, increases the amount of processing performed by the ground-side controller, and restricts the number of vehicles that are allowed to pass through the merging section. Thus, it is preferable not to use blocking in the control at the merging section.

Hereinafter, an example that does not use blocking will be described. Japanese Patent No. 4798554 has proposed a system for controlling the positions of vehicles using a ground-side controller. In this system, each vehicle reports its current position and the like in each control cycle, the ground-side controller gives an instruction about a target position, and the vehicle controls its velocity so as to reach the given target position. In this system, blocking is replaced with instructions about target positions. However, Japanese Patent No. 4798554 has not conducted any particular research on control of the order for passing through the merging section and the like. Alternatively, for the purpose of eliminating the need for blocking, for example, RFID is conceivable in which a flag indicating that a vehicle is travelling is set when the vehicle enters the merging section, and is cancelled when the vehicle has passed through the merging section. Communication between vehicles using RFID eliminates the need for blocking. However, according to this configuration, a flag has to be reliably set and cancelled in the RFID system.

SUMMARY OF THE INVENTION

Preferred embodiments of the present invention eliminate the need for blocking at a merging section.

According to a preferred embodiment of the present invention, a vehicle system includes a travel route including a merging section including a first entrance and a second entrance; a plurality of vehicles configured to travel on the travel route in one direction; a ground controller configured and programmed to communicate with the plurality of vehicles; a mapping unit configured to map any other vehicle expected to enter the merging section from the first entrance when a first vehicle is expected to enter the merging section from the second entrance, on the travel route of the first vehicle, based on a position and a velocity of the first vehicle and a position and a velocity of the other vehicle; a determining unit configured to determine a preceding-following relationship between the first vehicle and the other vehicle from the position of the first vehicle and the position of the other vehicle mapped by the mapping unit; and a control unit configured and programmed to control travel of the first vehicle so as to avoid a collision with the other vehicle.

Moreover, another preferred embodiment of the present invention provides a method for controlling vehicles in a vehicle system provided with a travel route including a merging section, a plurality of vehicles configured to travel on the travel route in one direction, and a ground controller configured and programmed to communicate with the plurality of vehicles, the method including the steps of causing a mapping unit disposed in the ground controller or each vehicle to map any other vehicle expected to enter the merging section from the first entrance when a first vehicle is expected to enter the merging section from the second entrance, on the travel route of the first vehicle, based on a position and a velocity of the first vehicle and a position and a velocity of the other vehicle; causing a determining unit disposed in the ground controller or each vehicle to determine a preceding-following relationship between the first vehicle and the other vehicle from the position of the first vehicle and the position of the other vehicle mapped by the mapping unit; and causing a control unit disposed in the ground controller or each vehicle to control travel of the first vehicle so as to avoid a collision with the other vehicle.

According to various preferred embodiments of the present invention, the preceding-following relationship between a first vehicle expected to enter the merging section from the first entrance and any other vehicle expected to enter the merging section at that time from the second entrance is determined based on a position and a velocity of the first vehicle and a position and a velocity of the other vehicle. Thus, which vehicle travels through the merging section earlier is accurately determined contrary to determination simply based on the distances to the merging section or the like. Then, any other vehicle determined as a preceding vehicle based on this determination is mapped on the travel route of the first vehicle, and the travel is controlled so as to avoid a collision with the mapped other vehicle. Thus, vehicles are allowed to travel through the merging section while preventing a collision between the vehicles without blocking. In this specification, the description regarding the vehicle system is applicable as it concerns the method for controlling vehicles, and the description regarding the method for controlling vehicles is applicable as it concerns the vehicle system.

Preferably, the determining unit, the mapping unit, and the control unit are arranged in the ground controller, each vehicle periodically reports at least a position and a velocity to the ground controller, and on each vehicle travelling on the travel route regardless of whether or not the vehicle is expected to enter the merging section, the ground controller maps any other vehicle on the travel route of each vehicle. With this configuration, preceding vehicles not only in the merging section but also throughout the travel route are determined from a report on the position and the velocity. Furthermore, since preceding other vehicles are mapped on the travel route of each vehicle, other vehicles from which an inter-vehicle distance has to be maintained become clear, and the control unit disposed on the ground controller controls travel of vehicles so as to avoid a collision with these vehicles.

Preferably, a plurality of points are set along the travel route, and each vehicle periodically transmits a time when the vehicle will pass through the points to the ground controller. Since vehicles that will pass through the same point earlier may precede each vehicle, candidates for the preceding vehicles are easily narrowed down.

Preferably, the mapping unit maps the other vehicle so as to arrange the first vehicle and the other vehicle such that a vehicle expected to reach the merging section earlier is taken as a preceding vehicle and a vehicle expected to reach later is taken as a following vehicle. That is to say, the mapping determines which of the first vehicle or the other vehicle will reach the merging section earlier, in a broader sense, to determine which vehicle will reach points along the travel route earlier. For example, if the time required for the first vehicle to reach the merging section is taken as t1, the time required for the second vehicle as t2, and the velocity of the first vehicle as v, the second vehicle is mapped on the upstream side by t2·v from the merging section. In this example, the first vehicle is on the upstream side by t1·v from the merging section, and, thus, the vehicle that reaches the merging section earlier is mapped as a preceding vehicle and the vehicle that reaches later as a following vehicle.

Preferably, the mapping unit maps a vehicle expected to pass through a point earlier than the first vehicle and merging from another travel route onto the travel route of the first vehicle, as the other vehicle, on the travel route of the first vehicle. With this configuration, the number of other vehicles for which the preceding-following relationship has to be determined is restricted to be small. Note that other vehicles that will pass through the points earlier than the first vehicle and are travelling on the same travel route as the first vehicle are each mapped, for example, based on the actual position (current location).

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described. The scope of the present invention is based on the claims, and is intended to be determined in accordance with the understanding of a person skilled in the art with reference to the description of preferred embodiments of the present invention and related art in the field of the present invention.

Figure 1:
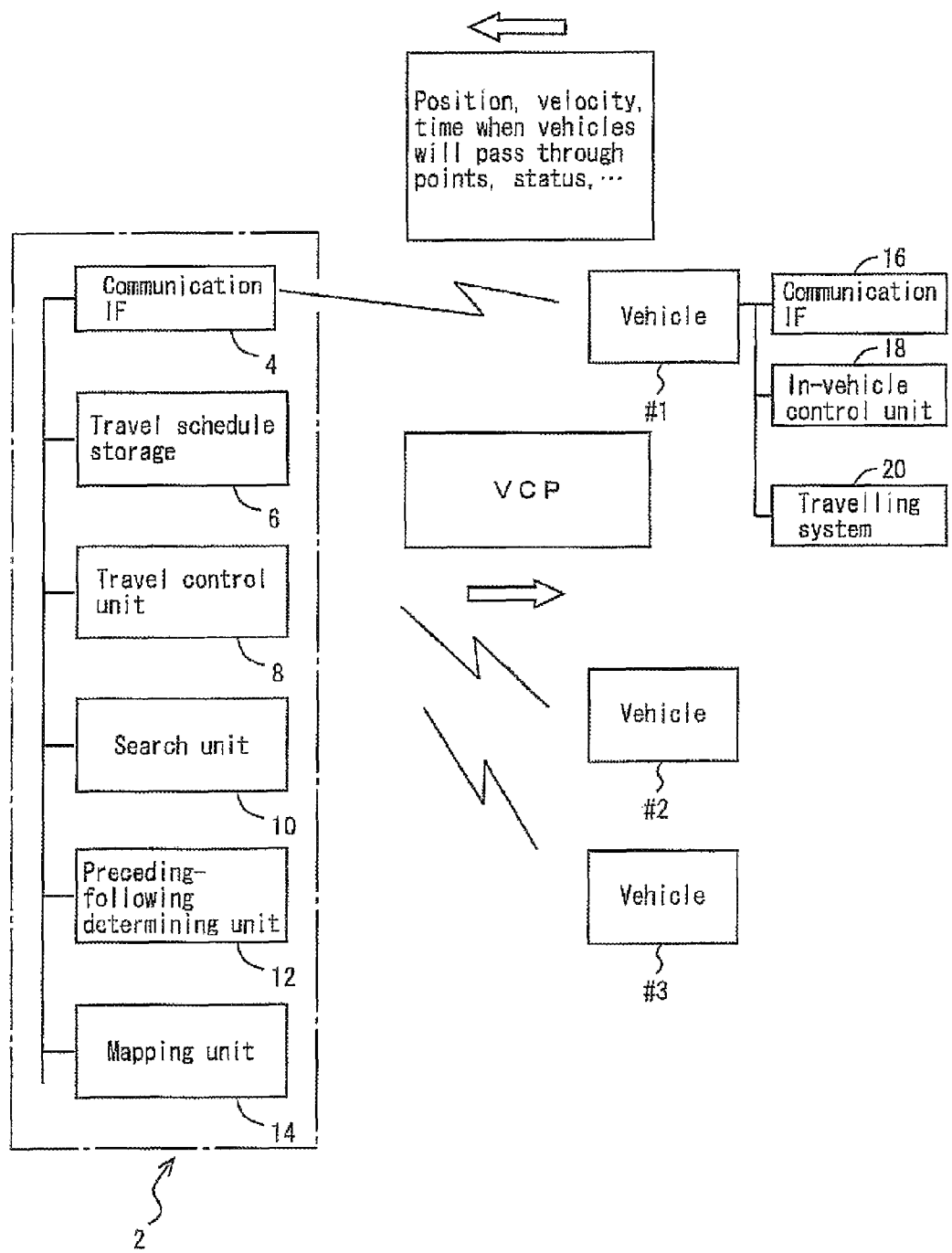
FIG. 1 is a block diagram according to a preferred embodiment of the present invention.
Figure 2:
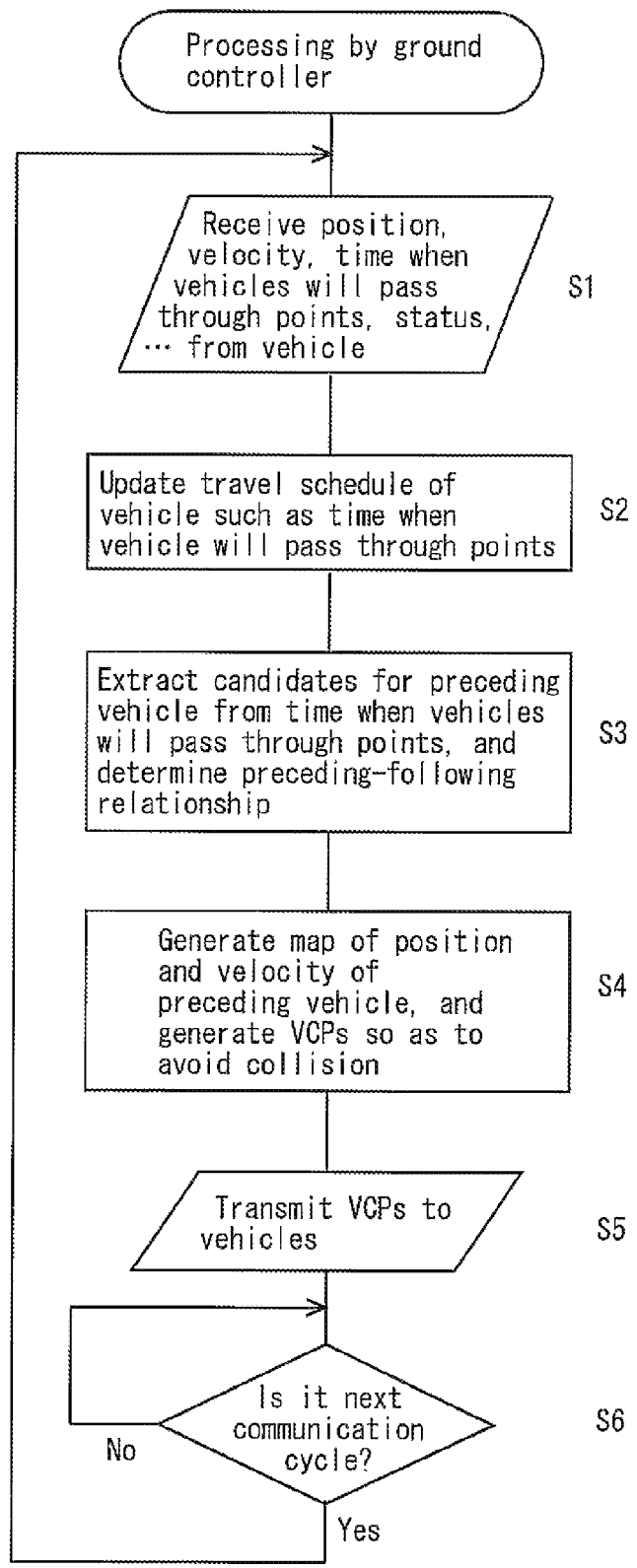
FIG. 2 is a flowchart showing processing by a ground controller.
Figure 3:
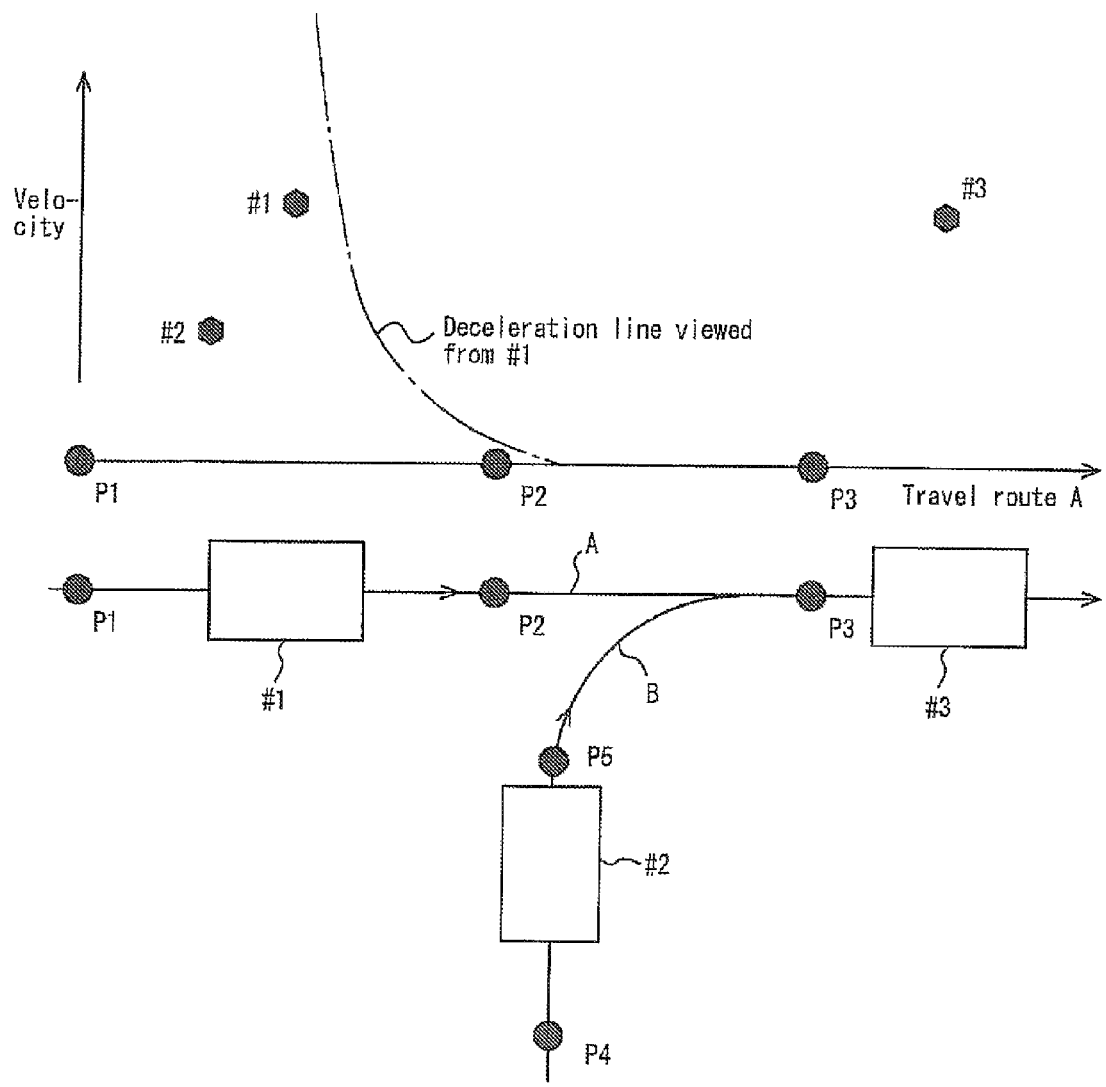
FIG. 3 is a view showing travel routes and mapping of preceding vehicles.

FIGS. 1 to 3 show a preferred embodiment of the present invention. In FIG. 1, reference numerals #1 to #3 respectively denote vehicles that amount to approximately several hundred overhead travelling vehicles, auto-guided vehicles, or the like, and 2 denotes a ground controller that may be physically divided, for example, into a host controller and zone-based controllers that are each in charge of communication between the host controller and vehicles in that zone. The ground controller 2 (hereinafter, simply referred to as a "controller 2") communicates via a communication IF 4 with vehicles #1 to #3 in a cycle of, for example, 100 msec, and stores travel schedules of vehicles #1 to #3 in a travel schedule storage 6, for example, for each vehicle. The travel schedule refers to, for example, the position and the current velocity of each vehicle, or the distance to one or a plurality of points through which the vehicle will pass and the time when the vehicle will pass. Note that a plurality of points are set on a route, including those on the entrance side and the exit side of a merging section and a diverging section. A travel control unit 8 controls travel of vehicles so as to avoid a collision with preceding other vehicles that have been mapped on the same travel route by a mapping unit 14 (described later). The travel of vehicles is controlled by transmitting, at most, three VCPs (for velocity control instructions) to the vehicles in each control cycle. VCP specifies when, where, and how to change the target velocity. In other words, VCP is configured by the time when the target velocity is changed, and the position and the new target velocity at that time. Compared with instructions specifying target positions and the like in each control cycle, instructions using VCPs allow more processing to be performed inside the vehicles, and, for example, the vehicle system smoothly operates even if the control cycle is made longer.

A search unit 10 searches for, for example, the times when the vehicles will pass through each point. The search is performed for each of all vehicles that are travelling. When one vehicle is selected, one or a plurality of points through which the selected vehicle will pass and the point through which the vehicle has just passed are selected, and other vehicles that are scheduled to pass through these points within a predetermined time difference from the selected vehicle are searched for. These other vehicles are vehicles that may precede the selected vehicle. Note that the selected vehicle may be referred to as a "vehicle a" so as to distinguish it from the other vehicles. The search unit 10 narrows down target vehicles for which the preceding-following relationship is to be determined, and may not be provided. A preceding-following determining unit 12 determines the preceding-following relationship between vehicles. In a simple zone having no merging section on a travel route, the preceding-following relationship is immediately known from the current positions or the like of the vehicles. In a zone having a merging section, the current positions cannot be simply compared with each other, and, thus, the preceding-following determining unit 12 determines the preceding-following relationship after other vehicles that will merge onto the same travel route are mapped on the same travel route by the mapping unit 14. Other vehicles that will merge include vehicles that are travelling, as well as vehicles that are at a stop near the merging section and obstruct the travel of the vehicle a.

The mapping unit 14 maps other vehicles from which an inter-vehicle distance has to be maintained, on the travel route of each vehicle. Other vehicles in the same zone having no merging section are mapped at the current positions, and their positions do not shift by the mapping. Other vehicles that will merge at the merging section are mapped according to the time required to reach a reference point such as a point immediately after the merging section. Specifically, if the required time is taken as t and the velocity of the vehicle a as v, for example, this vehicle is mapped on the upstream side by t·v from the reference point. This mapping is performed to determine which vehicle will reach the reference point earlier, and any mapping may be used as long as it determines mapping destinations of other vehicles on the travel route using the velocity of the vehicle a, the velocities of the other vehicles, and the distances from the other vehicles to the reference point. For example, if the vehicle a is accelerated or decelerated later, the mapping destinations may be changed according to the acceleration or deceleration. Furthermore, if other vehicles are accelerated or decelerated later, the mapping destinations may be changed according to the acceleration or deceleration. If the preceding-following relationship between the vehicle a and the other vehicles is determined, immediately preceding vehicles from which an inter-vehicle distance has to be maintained are determined. Accordingly, vehicles that have travelled sufficiently ahead do not have to be mapped, and vehicles that are located clearly behind do not have to be mapped either. The travel control unit 8 generates VCPs to vehicles so as to avoid a collision with preceding other vehicles, based on the distances to the other vehicles mapped on the same travel route, the distances and the relative velocities, or the like. The communication IF 4 transmits the generated VCPs to the respective vehicles, and the vehicles control the velocity according to the VCPs transmitted thereto, so that collisions between the vehicles are avoided. Note that the target velocities, the target positions, and the like may be transmitted to the vehicles instead of the VCPs, or the positions and the velocities of preceding other vehicles may be transmitted to each vehicle so that the vehicle autonomously controls its own velocity. That is to say, the preceding-following determining unit 12 and the mapping unit 14 may be provided in each vehicle, and a collision with other vehicles may be avoided by an in-vehicle control unit.

Each vehicle preferably has the same configuration including a communication IF 16 that establishes communication with the controller 2 and an in-vehicle control unit 18 that controls a travelling system 20 configured by an engine and wheels, and the like. The in-vehicle control unit 18 controls travel of the vehicle such that it travels to the destination while passing through each point according to the travel schedule, and maintains a necessary inter-vehicle distance from preceding other vehicles.

FIGS. 2 and 3 show an operation of the present preferred embodiment. FIG. 3 illustrates the processing using vehicle #1 as a reference, where the travel route of vehicle #1 is taken as a travel route A and the travel route of vehicle #2 as a travel route B. Here, P1 to P5 each denote a point, where the point P3 is located at the exit of a merging section, and the points P2 and P5 are located at the entrances of the merging section. The points are set at the exits and the entrances of merging sections and diverging sections, stop positions such as stations, the exits and the entrances of curves, and the like, and are set at other positions as well at appropriate intervals. When assuming that the travel schedule of a vehicle refers to the time when the vehicle will pass through a point, every time one vehicle is selected, vehicles that pass through the same point earlier are taken as candidates for preceding vehicles. Thus, target vehicles for which the preceding-following relationship is to be determined are easily narrowed down.

The distance to the point P3 is shorter from vehicle #2 than from vehicle #1, but vehicle #2 is decelerated due to velocity limit at a curved zone in the merging section, and, thus, vehicle #1 reaches the point P3 earlier. Thus, if vehicles #1 and #2 are mapped on the travel route A in consideration of velocity, vehicle #1 is mapped as a preceding vehicle and vehicle #2 as a following vehicle. The upper portion in FIG. 3 shows the velocities and the positions of mapped vehicles #1 to #3, and, if there is any other vehicle on the inner side of the deceleration line ahead of vehicle #1, vehicle #1 is decelerated to maintain an inter-vehicle distance. The deceleration line is a line indicating the range where the vehicle has to be decelerated due to the velocities and the distances of the preceding and following vehicles. In FIG. 3, vehicles #2 and #3 are mapped, but only preceding vehicles on the deceleration line or on the inner side thereof are necessary, and vehicle #2 following vehicle #1 does not have to be mapped. Furthermore, vehicle #3 does not have to be mapped either if it has travelled sufficiently ahead.

As shown in FIG. 2, the ground controller receives a report from each vehicle periodically in a cycle of, for example, 100 msec. This report includes the position, the velocity, the IDs of points through which the vehicle has already passed, the IDs of several points through which the vehicle will pass and the times when the vehicle will pass, VCP results (data indicating when, where, and how the target velocity was changed), VCP plans (data indicating when, where, and how to change the target velocity), and status that the vehicle is travelling, at a stop, offloading, picking up articles, or the like (Step S1). According to this information, the ground controller updates the travel schedule such as the time when the vehicle will pass through a point (Step S2). According to this time or the like, the ground controller extracts other vehicles that may precede the vehicle, and determines the preceding-following relationship between vehicles, based on actual positions for other vehicles on the same travel route, or based on the mapping for other vehicles that will merge from another travel route (Step S3). In other words, the preceding-following relationship between vehicles traveling on the same travel route is determined based on the actual positions, and the preceding-following relationship with other vehicles that will merge onto the same travel route is determined based on the times required to reach a predetermined position obtained from the velocities and the positions. Then, a map (shown in the upper portion in FIG. 3) is generated for each vehicle indicating the positions and the velocities of its preceding and following vehicles, and VCPs for the respective vehicles are generated based on this map so as to avoid a collision with the preceding vehicle (Step S4). The vehicles are notified of the VCPs, and cause their in-vehicle control units to control the velocities according to the VCPs (Step S5). Note that there is no need to generate a new VCP for a vehicle whose velocity does not have to be changed. The above-described processing is repeated in each control cycle, thereby avoiding a collision between the vehicles (Step S6).

This preferred embodiment achieves the following advantageous effects.

The number of vehicles that are allowed to pass through a merging section increases because the need for blocking in the travel through the merging section is eliminated, the processing by the ground controller becomes easy, and the amount of communication is reduced.

The processing is performed based on how long it takes to reach a merging section, because even a vehicle close to the merging section is determined to be a following vehicle if it is travelling at a low velocity.

A necessary inter-vehicle distance is maintained between vehicles not only in a merging section but also throughout the entire travel route.

The preceding-following relationship is easily determined by causing each vehicle to transmit the time when the vehicle will pass through a point to the ground controller or by causing the ground controller to calculate the time when each vehicle will pass through a point from the position and the velocity of the vehicle. That is to say, vehicles that pass through the same point earlier may be taken as target vehicles for which the preceding-following relationship is to be determined.

A map of preceding vehicles is generated for each vehicle. For example, if vehicle #1 precedes vehicle #2, a map about vehicle #2 shows vehicle #1 as a preceding vehicle, and a map about vehicle #1 does not show vehicle #2. Thus, for each vehicle, other vehicles from which an inter-vehicle distance has to be maintained become clear.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle system comprising:
a travel route including a merging section including a first entrance and a second entrance;
a plurality of vehicles configured to travel on the travel route;
a ground controller configured and programmed to communicate with the plurality of vehicles;
a mapping unit configured to map any other vehicle expected to enter the merging section from the first entrance when a first vehicle is expected to enter the merging section from the second entrance, on the travel route of the first vehicle, based on a position and a velocity of the first vehicle and a position and a velocity of the other vehicle;
a determining unit configured to determine a preceding-following relationship between the first vehicle and the other vehicle from the position of the first vehicle and the position of the other vehicle mapped by the mapping unit; and
a control unit configured and programmed to control travel of the first vehicle so as to avoid a collision with the other vehicle; wherein
each of the plurality of vehicles is configured to periodically transmit, to the ground controller, an expected time that the respective vehicle is expected to pass through a predetermined point at an exit of the merging section.

2. The vehicle system according to claim 1, wherein
the determining unit, the mapping unit, and the control unit are provided in the ground controller;
each vehicle periodically reports at least a position and a velocity to the ground controller; and
on each vehicle travelling on the travel route regardless of whether or not the vehicle is expected to enter the merging section, the ground controller maps any other vehicle on the travel route of the each vehicle.

3. The vehicle system according to claim 2, wherein a plurality of further predetermined points are set along the travel route, and each vehicle periodically transmits further expected times when the respective vehicle is expected to pass through each of the plurality of further predetermined points to the ground controller.

4. The vehicle system according to claim 1, wherein the mapping unit maps the other vehicle so as to arrange the first vehicle and the other vehicle such that a vehicle expected to reach the merging section earlier is taken as a preceding vehicle and a vehicle expected to reach later is taken as a following vehicle.

5. The vehicle system according to claim 3, wherein the mapping unit maps a vehicle expected to pass through a point earlier than the first vehicle and to merge from another travel route onto the travel route of the first vehicle, as the other vehicle, on the travel route of the first vehicle.

6. The vehicle system according to claim 1, wherein each of the plurality of vehicles is an overhead traveling vehicle.

7. The vehicle system according to claim 1, wherein:
the mapping unit is provided in the ground controller; and
the ground controller maps each of the plurality of vehicles according to the expected time of each of the plurality of vehicles.

8. The vehicle system according to claim 1, wherein the other vehicle is mapped according to the expected time of the other vehicle and the velocity of the first vehicle.

9. A method for controlling vehicles in a vehicle system provided with a travel route including a merging section including first entrance and a second entrance, a plurality of vehicles configured to travel on the travel route, and a ground controller configured and programmed to communicate with the plurality of vehicles, the method comprising the steps of:
causing a mapping unit disposed in the ground controller or each vehicle to map any other vehicle expected to enter the merging section from the first entrance when a first vehicle is expected to enter the merging section from the second entrance, on the travel route of the first vehicle, based on a position and a velocity of the first vehicle and a position and a velocity of the other vehicle;
causing a determining unit disposed in the ground controller or each vehicle to determine a preceding-following relationship between the first vehicle and the other vehicle from the position of the first vehicle and the position of the other vehicle mapped by the mapping unit; and
causing a control unit disposed in the ground controller or each vehicle to control travel of the first vehicle so as to avoid a collision with the other vehicle; wherein
each of the plurality of vehicles periodically transmits, to the ground controller, an expected time that the respective vehicle is expected to pass through a predetermined point at an exit of the merging section.

10. A vehicle system comprising:
a travel route including a merging section including a first entrance and a second entrance;
a plurality of vehicles configured to travel on the travel route, each of the plurality of vehicles including an in-vehicle control unit;
a ground controller configured and programmed to communicate with the in-vehicle control unit of each of the plurality of vehicles;
a mapping unit configured to map any other vehicle expected to enter the merging section from the first entrance when a first vehicle is expected to enter the merging section from the second entrance, on the travel route of the first vehicle, based on a position and a velocity of the first vehicle and a position and a velocity of the other vehicle;
a determining unit configured to determine a preceding-following relationship between the first vehicle and the other vehicle from the position of the first vehicle and the position of the other vehicle mapped by the mapping unit; and
a control unit configured and programmed to control travel of the first vehicle so as to avoid a collision with the other vehicle;
wherein each of the plurality of vehicles is configured to periodically transmit, to the ground controller, an expected time that the respective vehicle is expected to pass through a predetermined point at an exit of the merging section.

11. The vehicle system according to claim 10, wherein
the determining unit, the mapping unit, and the control unit are provided in the ground controller;
each vehicle periodically reports at least a position and a velocity to the ground controller; and
on each vehicle travelling on the travel route regardless of whether or not the vehicle is expected to enter the merging section, the ground controller maps any other vehicle on the travel route of the each vehicle.

12. The vehicle system according to claim 10, wherein a plurality of further predetermined points are set along the travel route, and each vehicle periodically transmits further expected times when the respective vehicle is expected to pass through each of the plurality of further predetermined points to the ground controller.

13. The vehicle system according to claim 12, wherein the mapping unit maps a vehicle expected to pass through a point earlier than the first vehicle and to merge from another travel route onto the travel route of the first vehicle, as the other vehicle, on the travel route of the first vehicle.

14. The vehicle system according to claim 10, wherein the mapping unit maps the other vehicle so as to arrange the first vehicle and the other vehicle such that a vehicle expected to reach the merging section earlier is taken as a preceding vehicle and a vehicle expected to reach later is taken as a following vehicle.

15. The vehicle system according to claim 10, wherein each of the plurality of vehicles is an overhead traveling vehicle.

16. The vehicle system according to claim 10, wherein:
the mapping unit is provided in the ground controller; and
the ground controller maps each of the plurality of vehicles according to the expected time of each of the plurality of vehicles.

17. The vehicle system according to claim 10, wherein the other vehicle is mapped according to the expected time of the other vehicle and the velocity of the first vehicle.

* * * * *